(12) United States Patent
Czermak et al.

(10) Patent No.: US 11,447,413 B2
(45) Date of Patent: Sep. 20, 2022

(54) CONTINUOUS SOL-GEL PROCESS FOR PRODUCING SILICATE-CONTAINING GLASSES OR GLASS CERAMICS

(71) Applicant: D. SWAROVSKI KG, Wattens (AT)

(72) Inventors: Georg Czermak, Wattens (AT); Matthias Gander, Landeck (AT); Christina Streiter, Wattens (AT); Christian Gabl, Kematen (AT); Christian Lipp, Vomp (AT); Roy Layne Howell, Gainesville, FL (US); Nina Stepanik, Kotschach-Mauthen (AT)

(73) Assignee: D. SWAROVSKI KG, Wattens (AT)

(*) Notice: Subject to any disclaimer, the term of this patent is extended or adjusted under 35 U.S.C. 154(b) by 0 days.

(21) Appl. No.: 16/504,017

(22) Filed: Jul. 5, 2019

(65) Prior Publication Data

US 2019/0330098 A1   Oct. 31, 2019

Related U.S. Application Data

(62) Division of application No. 15/673,733, filed on Aug. 10, 2017.

(30) Foreign Application Priority Data

Aug. 12, 2016 (EP) .................................... 16184064

(51) Int. Cl.
*C03C 3/076* (2006.01)
*C03C 1/00* (2006.01)
*C03B 19/12* (2006.01)

(52) U.S. Cl.
CPC .............. *C03C 3/076* (2013.01); *C03B 19/12* (2013.01); *C03C 1/006* (2013.01);
(Continued)

(58) Field of Classification Search
CPC ......... C03C 3/076; C03C 1/006; C03B 19/12; C03B 2201/06; C03B 2201/40; C03B 2201/42
See application file for complete search history.

(56) References Cited

U.S. PATENT DOCUMENTS 3,767,432 A   10/1973   Thomas
4,278,632 A   7/1981   Toidas
(Continued)

FOREIGN PATENT DOCUMENTS

DE   19648797 A1   5/1998
EP   0131057 B1   11/1987
(Continued)

OTHER PUBLICATIONS

Ruili, et al., "Preparation of Rare Earth Element Doped Gradient Index Glass", pp. 222-227.
(Continued)

*Primary Examiner* — Queenie S Dehghan
(74) *Attorney, Agent, or Firm* — Eschweiler & Potashnik, LLC

(57) ABSTRACT

A continuous sol-gel process for producing silicate-containing glasses and glass ceramics is proposed, comprising the following steps:

(a) continuously feeding a silicon tetraalkoxide, a silicon alkoxide with at least one non-alcoholic functional group and an alcohol into a first reactor (R1), and at least partially hydrolyzing by the addition of a mineral acid to obtain a first product stream (A);

(b) continuously providing a second product stream (B) in a second reactor (R2) by feeding a metal alkoxide component or continuously mixing an alcohol and a metal alkoxide component;

(c) continuously mixing product streams (A) and (B) in a third reactor (R3) for producing a presol to obtain a third product stream (C);

(Continued)

(d) continuously adding water or a diluted acid to the product stream (C) to obtain a sol (gelation);
(e) continuously filling the emerging sol into molds to obtain an aquagel;
(f) drying the aquagels to obtain xerogels;
(g) sintering the xerogels to obtain silicate-containing glasses and glass ceramics.

19 Claims, 1 Drawing Sheet

(52) U.S. Cl.
CPC ...... *C03B 2201/06* (2013.01); *C03B 2201/40* (2013.01); *C03B 2201/42* (2013.01)

(56) References Cited

U.S. PATENT DOCUMENTS

| | | | | |
|---|---|---|---|---|
| 5,175,199 | A * | 12/1992 | Asano | C03C 1/006 257/E33.059 |
| 5,206,189 | A * | 4/1993 | Caldwell | C03C 1/006 501/12 |
| 5,236,483 | A * | 8/1993 | Miyashita | C03B 19/12 264/621 |
| 6,060,523 | A | 5/2000 | Moffett et al. | |
| 6,438,998 | B1 | 8/2002 | Oh et al. | |
| 2004/0134230 | A1* | 7/2004 | Kodas | B82Y 30/00 65/17.2 |
| 2005/0155385 | A1 | 7/2005 | Park et al. | |
| 2009/0093356 | A1* | 4/2009 | Yamamoto | C03C 1/006 501/10 |
| 2011/0107794 | A1 | 5/2011 | Ichinose et al. | |
| 2013/0299378 | A1 | 11/2013 | Sharma et al. | |
| 2014/0205972 | A1* | 7/2014 | Xia | A61K 6/833 433/215 |
| 2014/0323589 | A1 | 10/2014 | Lazar et al. | |
| 2015/0329413 | A1* | 11/2015 | Beall | C03C 4/18 501/63 |
| 2016/0083623 | A1 | 3/2016 | Wczasek et al. | |
| 2018/0044222 | A1 | 2/2018 | Czermak et al. | |
| 2018/0134565 | A1 | 5/2018 | Torsten et al. | |
| 2018/0203167 | A1 | 7/2018 | Matsuo et al. | |

FOREIGN PATENT DOCUMENTS

| | | | |
|---|---|---|---|
| EP | 0807610 | B1 | 11/1997 |
| EP | 1251106 | B1 | 10/2002 |
| EP | 1258457 | B1 | 11/2002 |
| EP | 1320515 | B1 | 6/2003 |
| EP | 1606222 | A1 | 12/2005 |
| EP | 1661866 | A1 | 5/2006 |
| EP | 1700830 | A1 | 9/2006 |
| EP | 1770063 | A1 | 4/2007 |
| EP | 2064159 | A1 | 6/2009 |
| EP | 2088128 | A1 | 8/2009 |
| EP | 2832690 | A1 | 2/2015 |
| JP | 2003246626 | A | 9/2003 |
| JP | 2009102219 | A | 5/2009 |
| KR | 19950006201 | | 6/1995 |
| TW | 528728 | B | 4/2003 |
| TW | 201402494 | A | 1/2014 |
| WO | WO-2005067001 | A2 * | 7/2005 ............ C03B 17/04 |
| WO | 2013061104 | A2 | 5/2013 |
| WO | 2015014813 | A1 | 2/2015 |
| WO | 2017010217 | A1 | 1/2017 |

OTHER PUBLICATIONS

Schubert, Ulrich, "Chemistry and Fundamentals of the Sol-Gel Process", In Sol-Gel Chemistry and Methods, Part One, 2015, 27 pages.
European Patent Office, "European Search Report", dated Jan. 27, 2017, 8 pages.
Lekahena, Clifford, "International Search Report and Written Opinion for PCT Patent Application No. PCT/EP2017/070409", dated Oct. 19, 2017, 14 pages.
Nogami, et al., "Glass Formation Through Hydrolysis of Si(OC2H5)4 with NH4OH and HCl Solution", In Journal of Non-Crystalline Solids, vol. 37, 1980, pp. 191-201.
Chinese Patent Office, "Office Action for Chinese Patent Application No. 201780044007.5", dated Mar. 3, 2021, 8 pages.
Taiwan Patent Office, "Office Action for Taiwan Patent Application No. 106126924", dated Oct. 20, 2020, 13 pages.
Dehghan, Queenie S., "Advisory Action for U.S. Appl. No. 15/673,733", dated Feb. 28, 2020, 3 pages.
Dehghan, Queenie S., "Final Office Action for U.S. Appl. No. 15/673,733", dated Dec. 13, 2019, 9 pages.
Dehghan, Queenie S., "Final Office Action for U.S. Appl. No. 15/673,733", dated Oct. 19, 2020, 10 pages.
Dehghan, Queenie S., "Office Action for U.S. Appl. No. 15/673,733", dated Jul. 25, 2019, 12 pages.
Dehghan, Queenie S., "Office Action for U.S. Appl. No. 15/673,733", dated May 21, 2020, 12 pages.
Dehghan, Queenie S., "Restriction Requirement for U.S. Appl. No. 15/673,733", dated Apr. 30, 2019, 7 pages.
The Korean Intellectual Property Office, "Office Action for Korean Patent Application No. 10-2019-7001328", dated Mar. 19, 2021, 7 pages.
Dehghan, Queenie S., "Office Action for U.S. Appl. No. 15/673,733", dated May 7, 2021, 12 pages.
Dehghan, Queenie, Final Rejection dated Sep. 24, 2021 in U.S. Appl. No. 15/673,733, (20 pages).

* cited by examiner

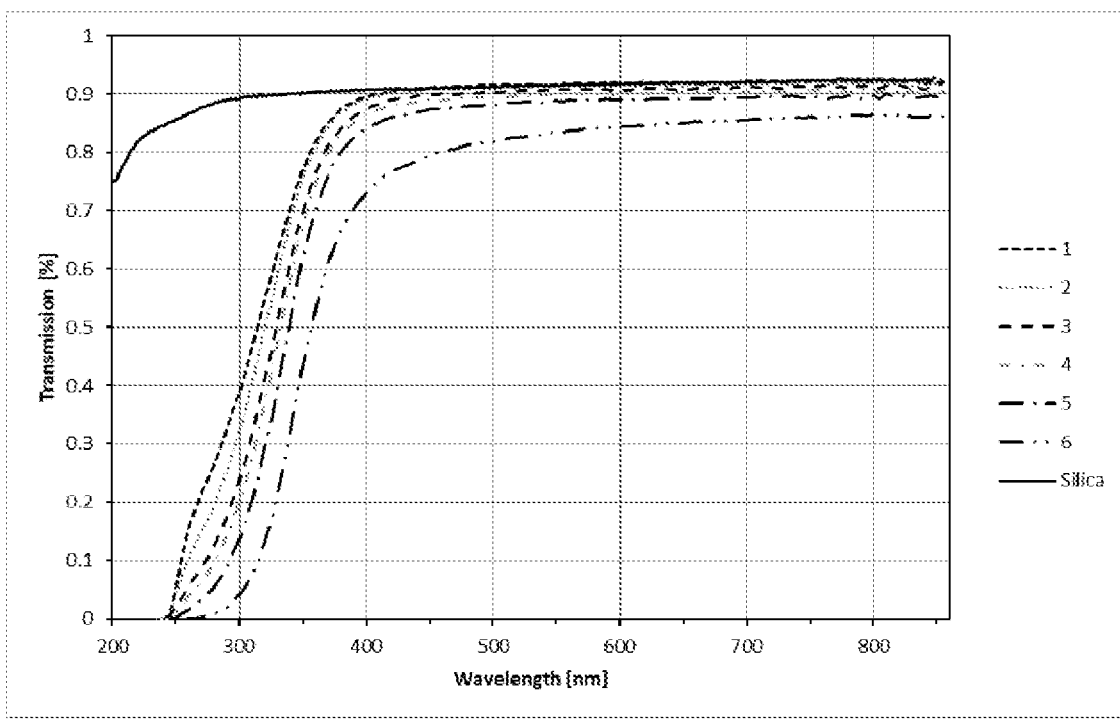

CONTINUOUS SOL-GEL PROCESS FOR PRODUCING SILICATE-CONTAINING GLASSES OR GLASS CERAMICS

CROSS-REFERENCE TO RELATED APPLICATIONS

This application is a divisional application of U.S. application Ser. No. 15/673,733, filed on Aug. 10, 2017, which, in turn, claimed the benefit of priority to the EPO application EP 16184064.0, filed on Aug. 12, 2016. The content of these prior applications are incorporated by reference herein in their entirety.

FIELD OF THE INVENTION

The invention pertains to the field of inorganic chemistry and relates to a continuous process for producing silicate-containing glasses or glass ceramics.

BACKGROUND ART

Three-dimensional quartz glass bodies can be prepared by the so-called sol-gel process. The principle of this process is based on an acid- or base-catalyzed hydrolysis followed by gelation because of condensation reactions. The originally liquid sol undergoes a transition through a stable liquid dispersion of oxide particles into a gel-like and finally solid state. The thus obtained aquagel is subsequently dried to a xerogel, and sintered to quartz glass. The final product is glassy. The porosity and morphology of the products can be adjusted by the addition of different additives, or through the drying schedule. In contrast to conventional quartz glass production by melting the raw materials at very high temperatures, the shaping takes place at room temperature in the sol-gel process. The glass bodies prepared with this technology usually need not be reworked, which is both more time-efficient and less expensive.

The starting materials of a sol-gel synthesis are low molecular weight metallic alkoxide compounds. The first step of this synthesis is the hydrolysis of the alkoxides in the presence of an acid or base. As a result of this process, unstable hydroxy compounds (a) are formed, which sometimes may easily oligomerize. The solution formed is a sol. In a condensation reaction, individual compounds grow together by the formation of siloxane bridges (Si—O—Si) (b). This process continues until all monomers are consumed. A contiguous network is not yet formed. Under suitable reaction conditions, all generated particles are in a uniform size distribution of a few nanometers. The reaction rates of the hydrolysis and condensation can be influenced through the medium, pH and concentration, and proceed simultaneously (c). The process was described in some detail by Nogami et al. in Journal of Non-crystalline Solids, 37, pp. 191-201 (1980).

In a suitable environment, a sol remains stable for several weeks, in part even months. The gelation takes place by condensation to form siloxane linkages. Now, the eponymous step of the synthesis, the sol-gel transition, is reached. From the loose particles of the sol, a three-dimensional network has formed, which is soaked with the solvent. The sol has become a gel.

After the gelation is complete, the aquagel is dried to a xerogel. The complete evaporation of the solvent causes a stronger cross-linking of the entire network. This step results in a compact, highly cross-linked and resilient material:

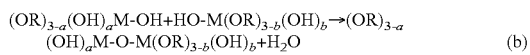

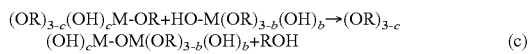

M=metal or metalloid, R=residue,
n=1-4
a=0-3
b=0-3
c=0-3

In the last step, the xerogel is sintered to quartz glass.

From the prior art, a large number of processes are known that deal with quartz glass production in general and the sol-gel process in particular.

From European Patent EP 0 131 057 B1 (Seiko), a batch process for producing quartz glass is known in which a hydrolyzed solution of a metal alkoxide of the formula $M(OR)_x$ is provided at first, from which a sol (colloidal solution) is formed. After gelation, the sol is dried to a xerogel. Subsequently, the xerogel is sintered to quartz glass.

According to European Patent EP 0 807 610 B1 (Lucent), a process is disclosed for producing a silica sol, which essentially consists of non-agglomerated silica, in which a starting mixture of silica particles in water is prepared, and the silica sol is formed from the mixture by shear-mixing. An alkaline substance without a metal cation is added to the sol to adjust the pH to from 6 to 9.

European Patent EP 1 251 106 B1 (Fitel) claims a process in which a sol is provided by mixing silica particles and water, wherein said particles have a surface area of from 5 to 25 $m^2/g$, contain at least 85% spherical particles, and the weight ratio of the particles to water is larger than 65%. Subsequently, the pH is adjusted to from 10 to 13 using a base, and a gelling agent is added to the sol. Tetramethylammonium hydroxide and tetraethylammonium hydroxide are used as bases.

From European Patent Application EP 1 258 457 A1 (Degussa), a process is known in which a silicon alkoxide is hydrolyzed, followed by the addition of Aerosil® Ox50, which is employed because of its special properties, its particle size and its surface area.

European Patent EP 1 320 515 B1 (Degussa) relates to a process in which two solutions are prepared, and then combined for reaction. Solution A is an aqueous acidic dispersion (pH 1.5) of a fumed silica (e.g., Aerosil® Ox50), while solution B is an aqueous basic dispersion (pH 10.5-13) of a fumed silica (e.g., Aerosil® Ox200). The molar ratio of $H_2O$ to $SiO_2$, the molar ratio of the Si compound in solution A to that in solution B, and the resulting pH of the mixture C (after the two solutions have been combined) are the critical features for obtaining three-dimensional bodies that are larger than 2 cm.

In European Patent Application EP 1 606 222 A1 (Degussa), a process is claimed in which either a sol or a corresponding precursor is prepared from a silicon alkoxide. Subsequently, the sol is hydrolyzed, and then colloidal $SiO_2$ is added.

According to European Patent Application EP 1 661 866 A1 (Evonik), an aqueous dispersion of fumed silica (colloidal silica) is provided, its pH is adjusted to from 2 to 0.5, and then TEOS is added. The thus obtained sol is subsequently adjusted to basic and cast into a mold, where it solidifies to a gel.

In European Patent Application EP 1 700 830 A1 (Degussa), a process is proposed in which an aqueous dispersion of pyrogenic metal oxide is provided at first, and a metal oxide, which was previously hydrolyzed by the addition of water, is added thereto. The thus obtained sol is subsequently cast into a mold, in which it gels.

European Patent Application EP 1 770 063 A1 (Dynax) relates to a process for preparing silica aerogels with a defined pore diameter and pore diameter distribution, in which silicon components containing both hydrolyzable and hydrophobic functional groups, preferably methyltrimethoxysilane, are hydrolyzed in an acidic aqueous surfactant solution. Non-ionic (e.g., polyoxyethylene alkyl ether, polyoxypropylene alkyl ether), cationic (cetyltrimethylammonium bromide or chloride) or anionic (sodium dodecylsulfate) surfactants are employed as possible solvents.

The process of European Patent Application EP 2 064 159 A1 (Degussa) includes the following steps: adding fumed $SiO_2$ to the acidic aqueous medium, and subsequently adding a silicon alkoxide to the dispersion obtained. The molar ratio of silicon dioxide to silicon alkoxide is to be from 2.5 to 5. This is a batch process, in which fumed silica is provided first, and then the silicon alkoxide is added.

In European Patent Application EP 2 088 128 A1 (Degussa), a process is proposed in which fumed $SiO_2$ is added to water adjusted to acidic, and a silicon tetraalkoxide is added to the thus obtained dispersion. The pH is adjusted again, and the mixture is placed into a container, where the sol solidifies to a gel. Thereafter, it is dried to a xerogel and sintered to a glass product.

From the international patent application WO 2013/061104 A2 (Debreceni Egyetem), a continuous process for preparing alcogels, aerogels and xerogels is known in which silanes are hydrolyzed in the presence of basic catalysts and a specific aqueous-organic solvent system and a gelation retarder, and inert particles are introduced into the solution.

A disadvantage of the batch processes of the prior art is the fact that defined discrete amounts can be prepared at a time, which may result in quality differences. The batch production favors the inclusion of air bubbles in the glass, which also leads to quality reduction. A further disadvantage is the extensive cleaning of all systems required after each run. In addition, a continuous process offers simpler possibilities of scaling up.

It has been the object of the present invention to overcome the above described drawbacks and, in addition, to produce multicomponent glasses and glass ceramics with a high refractive index. One possibility is to perform the synthesis in a continuous process and to feed alkoxide components, which lead to an increase of the refractive index. Because of the continuous reaction mode, any amounts of silicate-containing glasses and glass ceramics of a constant high quality can be prepared.

BRIEF DESCRIPTION OF THE DRAWINGS

The single FIGURE shows transmission data of inventive products in comparison to conventional silica glass.

DESCRIPTION OF THE INVENTION

The present invention relates to a continuous sol-gel process for producing silicate-containing glasses and glass ceramics, comprising the following steps:
(a) continuously feeding a silicon tetraalkoxide, a silicon alkoxide with at least one non-alcoholic functional group and an alcohol into a first reactor (R1), and at least partially hydrolyzing by the addition of a mineral acid to obtain a first product stream (A);
(b) continuously providing a second product stream (B) in a second reactor (R2) by feeding a metal alkoxide component or continuously mixing an alcohol and a metal alkoxide component;
(c) continuously mixing product streams (A) and (B) in a third reactor (R3) for producing a presol to obtain a third product stream (C);
(d) continuously adding water or a diluted acid to the product stream (C) to obtain a sol (gelation);
(e) continuously filling the emerging sol into molds to obtain an aquagel;
(f) drying the aquagels to obtain xerogels;
(g) sintering the xerogels to obtain silicate-containing glasses and glass ceramics.

The term "presol" as mentioned in step (c) of the process according to the invention refers to dispersion/solution of product stream (C) before water or acid or, in case of silica glass ammonia, is added. In contrast thereto, the term "sol" as used in step (d) of the inventive process refers to the mixture of presol and water/acid/ammonia and is characterized by complete hydrolysis of the remaining alcohol moieties. The OH-groups formed at the silicon further react with each other under elimination of water, a process referred to as gelation.

Surprisingly, it has been found that the novel continuous process solves all of the above described varied problems simultaneously and entirely. Not only does the process allow for the production of arbitrary and therefore always different amounts of product, but also the synthesis leads to products of a constantly high quality.

It was further surprisingly found that the continuous process according to the invention allows the incorporation of rather high amounts of metal alkoxide component. The presence of a metal oxide in the sol usually speeds up the gelation process, which leads to problems during the process as the viscosity of the product stream in the system increases, reducing its flowability in the process. This can lead to the product stream becoming solid, thereby halting the process. It was surprisingly found that the undesired decrease in gelation time can be avoided by conducting the process of production in a continuous manner. Also, the product obtained by the inventive process can be further processed immediately, without the need of any additional melting steps. The process according to the invention thus allows the production of crack-free and transparent glass or glass ceramics with a high amount of metal alkoxide.

In addition, due to the continuous manner in which it is conducted, the inventive process allows for a great deal of flexibility with respect to the composition of the sol as components and amounts can be changed at any given time during the production. In turn, the new found flexibility allows the control of the density and refractive index of the product over a wide area. The inventive process operates as a closed system thereby eliminating the need for working in a protective atmosphere and limiting the exposure of the worker to the chemicals used.

Further, a preferred embodiment of the process according to the invention is to feed the starting materials of the synthesis in a degassed state, because it has been found that, without this step, gases dissolved in the starting materials are released by the mixing because of an altered solubility, and may induce undesirable bubble formation. In principle, degassing can be effected in any of the process steps (a) to (e), i.e., on the level of the starting materials, the presol, a dispersion, or the sol itself. Preferably, the starting materials are already degassed and employed in the synthesis in this form. For the sake of security, both the starting materials and the presol, the dispersion or sol may be degassed.

According to the invention, the degassing is preferably performed with ultrasound. Alternatively, possible methods include:
vacuum degassing;
distillation;
reduced pressure/freezing cycles;
thermal degassing;
chemical methods, such as oxygen removal by chemical binding;
gas removal by means of inert gas;
addition of deaeration additives; and
centrifuging;
or a combination of two or more of these measures.

In addition, the starting materials may optionally be employed in a particle free form by using suction filters, and each mold can be filled with freshly prepared sol. Thus, by avoiding rejects that do not comply with the specifications, mainly the profitability of the process is significantly enhanced, all the more so since long cleaning times can be dropped, especially since the reactors that are preferably to be employed can be easily cleaned with rinsing media.

Therefore, the present invention relates to silicate-containing glasses or silicate-containing glass ceramics according to the claims, and processes for producing them. Process steps (a) to (g) are further explained in the following.

Process Step A

Silicon alkoxides, which are possible starting materials for the production of the silicate-containing glasses or silicate-containing glass ceramics according to the invention, preferably comply with formula (I)

$$Si(OR)_4 \quad\quad (I),$$

in which R represents an alkyl radical with 1 to 6 carbon atoms. Typical examples include tetrapropyl orthosilicate and tetrabutyl orthosilicate, but tetramethyl orthosilicate (TMOS) and especially tetraethyl orthosilicate (TEOS) are preferably employed. In a preferred embodiment, since TEOS is insoluble in water, alcoholic, especially ethanolic, solutions can be employed, in which the alcohol adopts the function of a phase-transfer agent. The silicon alkoxides may also include other silicon compounds as additives, such as methyltriethylsilane, dimethyldiethylsilane, trimethylethylsilane, methyltriethoxysilane (MTES), triethoxyoctylsilane, octylmethyldichlorosilane, triethoxyvinylsilane, vinyltrimethoxysilane, and the like.

In an especially preferred embodiment, the additive is methyltriethoxysilane (MTES) and the silicon tetraalkoxide is tetraethyl orthosilicate (TEOS).

It was surprisingly found that the addition of a silicon alkoxide with at least one non-alcoholic functional group leads to an increase in the transparency of the obtained glass or glass ceramic. Without being bound by theory, it is believed that the presence of the silicon alkoxide with at least one non-alcoholic functional group prevents complete cross-linking, allowing the formation of a sufficient number of open pores. Due to the open pores, any volatile material trapped in the gel and glass or the glass ceramic can easily be evaporated during drying and sintering without the danger of crack-forming. In conventional process, the glass or glass ceramic might suffer from crack-formation during drying and sintering due to volatile material still present in the product which will lead to destruction of the glass or glass ceramic due to build-up pressure upon heating. This problem is overcome by the inventive process. Thus, the inventive process allows the formation of highly transparent glass or glass ceramic which are crack-free and can be densely sintered.

In a preferred embodiment of the inventive process, the weight ratio of silicon tetraalkoxide and the silicon alkoxide with at least one non-alcoholic functional group is in the range of 30:1 to 1:5, preferably 25:1 to 1:5, more preferably 20:1 to 1:1, and in particular 15:1 to 5:1. It was surprisingly found that the yield of the process and the quality of the product, in particular with respect to transparency, could be further increased when the ratio of said two components was within the claimed range.

The acidic hydrolysis of the silicon alkoxides is effected in reactor R1 in the presence of mineral acids, such as sulfuric acid, nitric acid and hydrochloric acid, or in the presence of acetic acid. The mentioned acids are preferably employed in an aqueous diluted form, and diluted nitric acid with a concentration of about 1.00 mol/l has proven particularly favorable. Alternatively, aqueous hydrochloric acid, to which surface-active substances may optionally be added, is also suitable. The amount of water added with the acid is added stoichiometrically here, so that in TEOS, for example, preferably only one ethanolate group at a time is cleaved off and replaced by OH⁻. The preferred volume ratio of alkoxide to mineral acid is from 1:1 to 20:1, more preferably from 5:1 to 15:1, and even more preferably from 7:1 to 12:1. The hydrolysis is performed at a suitable temperature by feeding the two starting materials using pumps, combining them and allowing them to react in a temperature-controlled flow reactor. When the starting materials are not miscible with one another, a slug flow may form in the flow reactor. Preferably, an alcohol, preferably ethanol, is added as a phase-transition agent. The temperature range of the hydrolysis is from 1 to 100° C., the preferred temperature being from 10 to 50° C. Preferably, the hydrolysis is effected at 18 to 40° C., especially at 20 to 25° C.

Process Step B

Metal alkoxide components, which are possible starting materials for the production of the silicate-containing glasses or silicate-containing glass ceramics according to the invention, are preferably organic transition metal alkoxides, preferably those of group 4-8 transition metals. The metal alkoxide components preferably comply with the formula $M(OR)_n(OH)_m$, with M=metal and R=radical (n+m corresponds to the valence of this cation). Preferably, M is selected from the elements of group 4 of the periodic table, Ti and Zr being preferred, while R is preferably an organic alkyl radical with 1 to 5 carbon atoms, preferably selected from the group of ethyl, propyl, isopropyl, butyl, isobutyl, pentyl, isopentyl or neopentyl radicals. Suitable metal alkoxide components are preferably alkyl orthotitanate, in particular tetraisopropyl orthotitanate $(Ti[OCH(CH_3)_2]_4)$ or zirconium(IV) alkoxide, in particular zirconium(IV) butoxide $(Zr(OCH_2CH_2CH_2CH_3)_4)$.

In the second process step, the metal alkoxide component is mixed with alcohol in a reactor R2. The reactor may also be temperature-controlled. Alternatively, the neat metal alkoxide component may also be employed. The preferred volume ratio of alcohol to metal alkoxide component is preferably from 1:5 to 5:1, more preferably from 2:1 to 1:2. The temperature is kept at 0 to about 40° C., preferably at 20 to 30° C.

Process Step C

While a first continuous stream of a hydrolyzed silicon alkoxide compound was prepared in the first process step and, also continuously, a second stream of an alcoholic solution of a second metal alkoxide component was produced in the second step, the mixing of the two streams and the forming of the presol are effected in the third step. Thus, product streams (A) and (B) are combined upstream of reactor R3 by means of a suitable mixing system. The volume ratios of the two streams (A) and (B) can be adjusted variably. The product properties of the finished glass can be influenced thereby. A preferred volume mixing ratio of (A) to (B) is from about 10:1 to about 1:10, more preferably from about 8:1 to about 1:5, even more preferably from about 4:1 to about 1:2. Depending on the quality demanded from the glass, the presol can be degassed here by suitable degassing methods, for example, by ultrasound. The combination of product streams (A) and (B) is performed at temperatures of from 0 to about 100° C., preferably from 0 to 40° C., more preferably at 20 to 30° C.

Process Step D

The subsequent gelation of the presol is induced by the addition of water or an acid when the pH is simultaneously changed. For this purpose, water or an acid, for example, a diluted mineral acid, such as sulfuric acid, nitric acid and hydrochloric acid, or else an organic acid, such as acetic acid (about 1.00 mol/l), is continuously fed to the continuously produced presol (product stream (C)). In process step (D), a corresponding molar quantity of water is added, so that all remaining alcoholate radicals are hydrolyzed, and the newly formed hydroxy groups subsequently condensate. Meanwhile, the system becomes cross-linked (gelation). The mixture is preferably cooled down to 5 to 0° C. in order that the gelation time is not too short.

In the present process step, various additions can be made to determine the product properties, such as the addition of cations, preferably the cations of the elements Na, K, Cs, Sr, Ba, B, Al, Zn, Y, La, Ce, Sm, Eu, Tb and Tm, or when colored glasses are desired, the cations of the elements V, Cr, Mn, Fe, Ru, Co, Ni, Cu, Au, Cd, Pr, Nd and Er, and mixtures thereof.

Reactors

According to the invention, the reaction is performed in a flow reactor, optionally with an upstream mixing element.

In the simplest embodiment, the reactors are flexible tubes made of some resistant material, such as teflon, polyamide, metal, polyethylene or polypropylene, which may have a length of about 1 cm to about 1000 m, preferably about 5 cm to about 500 m, and more preferably from 70 cm to 400 m, and on average have a cross-sectional width of about 1 to about 10 mm, preferably from about 1 to about 5 mm. These flexible tubes may be wound spirally, which significantly reduces the space requirements. For a given flow rate, the long paths correspond to the respectively optimum reaction time. Such assemblies are exceptionally flexible, because the lengths of flexible tubes can be arbitrarily elongated or shortened, and can be cleaned with low expenditure. Such a reaction mode can contribute substantially to the profitability of the process.

Gelation

The presol is continuously fed from the reactor R3 and cast into molds, in which gelation can take place. Because the thus obtained aquagels shrink in the mold during the ageing, they must be able to slide easily in the container. For this reason, especially containers made of a hydrophobic material, such as polyethylene, polypropylene, teflon, PVC or polystyrene, are suitable here.

The aquagels obtained must be demolded for processing, or be dried in the molds to xerogels. The demolding can be effected under particular conditions, for example, with an alcoholic solution. The drying conditions are influenced by the vapor pressures of the solvents in the gel, i.e., the alcohols, the water, and the acids. Compliance with a low evaporation rate keeps the gel from cracking. Conversely, long drying times make the process expensive, so that a compromise must be found here. The drying of the aquagel to xerogel is preferably effected at a temperature gradient from room temperature to 150° C. To control the drying atmosphere, the evaporation rate must be adjusted by correspondingly dimensioned openings and the optional presence of a drying solution.

Sintering

The sintering can be performed in a per se known manner. During the sintering, the remaining solvents still contained in the xerogels are removed, and the pores in the system are closed. The sintering temperature is up to 1400° C., and for most products, the sintering can be performed under normal atmosphere. Preferably according to the invention, the sintering is performed as follows:

1) removing the remaining solvents;
2) removing any undesirable organic compounds contained;
3) closing the existing pores to form silicate-containing glasses or glass ceramics.

In order to remove the solvents (1) and undesirable organic compounds formed by the decomposition of carbon-containing starting materials/products (2), calcination is performed at temperatures within a range of from about 600 to about 1100° C., preferably about 700 to about 900° C., more preferably about 750 to about 850° C. In step 3, the closing of the pores is effected by sintering at temperatures from about 800 to about 1400° C., preferably about 850 to about 1200° C., more preferably at about 950 to about 1100° C.

A further object of the present invention is a silicate-containing glass or silicate-containing glass ceramic obtainable by the inventive process. As mentioned above, the process according to the invention allows the production of highly transparent and crack-free glass or glass ceramic comprising a high amount of metal oxide compound. The inventive silicate-containing glass or silicate-containing glass ceramic is therefore characterized by a high transparency. The silicate-containing glass or silicate-containing glass ceramic preferably has a transparency close or equal to that of silica glass. In particular, the silicate-containing glass or silicate-containing glass ceramic is preferably transparent for light with a wave length in the visible spectrum, in particular light with a wave length ranging from 300 to 900 nm, preferably 350 to 850 nm and especially 380 to 780 nm.

In a preferred embodiment, the silicate-containing glass or silicate-containing glass ceramic according to the invention has a transmission in the range of visible light of at least 70%, preferably of at least 80% of the transmission of silica glass in the range of visible light, the transmission being determined by $I/I_0$ with $I_0$ being the initial intensity of the light. In a further preferred embodiment, the value of transmission of the silicate-containing glass or silicate-containing glass ceramic according to the invention does not differ more than 30%, preferably no more than 20%, from the value of transmission of silica glass in the range of visible light. In an especially preferred embodiment, the silicate-containing glass or silicate-containing glass ceramic according to the invention has a transmission comparable to the transmission of silica glass in the range of visible light.

In a preferred embodiment, the silicate-containing glass or silicate-containing glass ceramic according to the invention comprises the metal oxide component in an amount ranging from 10 wt.-% to 60 wt.-%, preferably 20 wt.-% to 55 wt.-%. In an alternative embodiment, the content of metal oxide component in the silicate-containing glass or the silicate-containing glass ceramic is preferably 10 to 35 wt.-%, especially 10 to 25 wt.-%.

The inventive silicate-containing glass or silicate-containing glass ceramic is further characterized by a high refractive index which can be controlled via addition of metal oxide components. Here, the inventive process allows the addition of rather high amounts of metal oxide component, making it possible to obtain silicate-containing glass or silicate-containing glass ceramic with high refractive indices. In a preferred embodiment, the silicate-containing glass or silicate-containing glass ceramic has a refractive index nD of 1.45 to 1.8, preferably 1.48 to 1.75, in particular 1.5 to 1.7.

In a preferred embodiment, the silicate-containing glass or silicate-containing glass ceramic according to the invention has a transmission which differs no more than 30%, preferably no more than 20% from the transmission of silica glass in the range of visible light, and a refractive index nD of 1.45 to 1.8, preferably 1.48 to 1.75, in particular 1.5 to 1.7.

EXAMPLES

The term "room temperature" as used in the present invention, refers to a temperature of 20° C.

Example 1

$SiO_2/TiO_2$ glass

Ethanol was supplied by a first pump, $HNO_3$ (1.0 mol/l) by a second one, and TEOS and MTES by two other pumps. The liquids were combined in flexible tubes by means of T pieces. The mixture had the following composition:

TEOS 45.0% by volume
MTES 4.5% by volume
EtOH 45.0% by volume
$HNO_3$ 5.5% by volume At room temperature, the mixture entered a first PA flexible tube (reactor R1) having a length of 200 m and an inner diameter of 2.7 mm; the dwelling time in the tube was about 25 minutes.

In the second reactor, a second metal alkoxide component, preferably tetraisopropyl orthotitanate, was mixed with an alcohol, preferably ethanol.

The product streams (A) and (B) were combined through another T piece and continuously mixed by means of a static mixing tube. The presol was subsequently degassed, and after addition of water, it was immediately filled into molds of PP (2×2×2 cm), which were sealingly closed. After about 10 seconds, gelation started. After a dwelling time of nine days in the closed molds, the lids were provided with holes, and the gel bodies were dried within the molds in the course of four days, while the temperature was increased from room temperature to 120° C. The xerogels were subsequently sintered to glass in a preheated sintering furnace over the following temperature gradient: 100 to 800° C. (7 hours), 800° C. (0.5 hour), 800 to 1030° C. (4.6 hours), 1030° C. (1 hour).

A glass having a composition of $SiO_2/TiO_2$=80/20 (% by weight) was obtained.

Example 2

$SiO_2/ZrO_2$ glass

According to the process in Example 1, glasses of the following composition were produced using zirconium(IV) butoxide: $SiO_2/ZrO_2$=45/55 (% by weight) and $SiO_2/ZrO_2$=70/30 (% by weight). In the second reactor (PTFE flexible tube), zirconium(IV) butoxide was employed instead of tetraisopropyl orthotitanate. Acetic acid (1 mol/l, V=15.6% $V_{presol}$) was continuously added to the presol to start the gelation. After a dwelling time of four days in the closed molds, the lids of the molds were removed, and the molds were transferred to sealable drying containers. For a controlled release of the solvents, the drying containers had small openings (diameter 0.1 to 4.0 mm), while a liquid (water or a mixture of ethanol, 1-butanol, formamide and water) was added for atmospheric control. Subsequently, the gel bodies were dried within the molds in the course of four days, while the temperature was increased from room temperature to 120° C. The xerogels were subsequently sintered to glass in a preheated sintering furnace over the following temperature gradient: 100 to 800° C. (7 hours), 800° C. (0.5 hour), 800 to 1030° C. (4.6 hours), 1030° C. (1 hour).

The FIGURE shows transmission data of inventive products in comparison to conventional silica glass. The compositions of the products are summarized in Table 1. The metal oxide component was $ZrO_2$. As can be seen, the inventive products have a transparency comparable to that of conventional silica glass, despite comprising high amounts of metal oxide component. Further, it can be depicted from the data summarized in Table 1 that the refractive index nD of the inventive products could be controlled by the addition of a metal oxide component.

Transmission was determined by UV-vis spectrometer with a thickness of the sample of 5 mm.

The refractive index was determined using a refractometer.

TABLE 1

| product | metal oxide component [wt.-%] | density [g/cm³] | nD |
|---|---|---|---|
| 1 | 21.2 | 2.332 | 1.5226 |
| 2 | 27.3 | 2.405 | 1.5428 |
| 3 | 32.0 | 2.567 | 1.5616 |
| 4 | 37.2 | 2.717 | 1.5833 |
| 5 | 42.5 | 2.862 | 1.6066 |
| 6 | 52.6 | 3.093 | 1.6604 |

It is claimed:

1. A silicate-containing glass ceramic made by a continuous sol-gel process, comprising the following steps:
    (a) continuously feeding a silicon tetraalkoxide, a silicon alkoxide with at least one non-alcoholic functional group and an alcohol into a first reactor (R1), and at least partially hydrolyzing by the addition of a mineral acid to obtain a first product stream (A);
    (b) continuously providing a second product stream (B) in a second reactor (R2) by feeding a metal alkoxide component or continuously mixing an alcohol and a metal alkoxide component;
    (c) continuously mixing product streams (A) and (B) in a third reactor (R3) for producing a presol to obtain a third product stream (C);
    (d) continuously adding water or a diluted acid to the product stream (C) to obtain a sol (gelation);
    (e) continuously filling the emerging sol into molds to obtain an aquagel;
    (f) drying the aquagels to obtain xerogels; and
    (g) sintering the xerogels at a temperature of 950 to 1100° C. to obtain silicate-containing glass ceramic;
    wherein the silicon alkoxide with at least one non-alcoholic functional group is selected from the group consisting of methyltriethylsilane, dimethyldiethylsilane, trimethylsilane, methyltriethoxysilane (MTES), triethoxyoctylsilane, octylmethyldichlorosilane, triethoxyvinylsilane and vinyltrimethoxysilane;

and wherein the weight ratio of silicon tetraalkoxide and the silicon alkoxide with at least one non-alcoholic functional group is in the range of 30:1 to 1:5 and wherein zirconium (IV) alkoxides are employed as the metal alkoxide components in step b) and the obtained glass ceramics comprise the metal oxide component in an amount of 20 to 55 wt. %; and wherein value of transmission of the silicate-containing glass ceramic in the range of visible light is about equal to the value of transmission of silica glass in the range of visible light.

2. The silicate-containing glass ceramic according to claim 1, characterized in that the silicate-containing glass ceramic have a refractive index nD of 1.45 to 1.8.

3. The silicate-containing glass ceramic according to claim 1, characterized in that the silicate-containing glass ceramic is transparent for light with a wavelength ranging from 300 to 900 nm.

4. The silicate-containing glass ceramic according to claim 1, characterized in that the silicate-containing glass ceramic is transparent for light with a wavelength ranging from 380 to 780 nm.

5. The silicate-containing glass ceramic according to claim 1, wherein a metal oxide component is present in an amount ranging from 20 wt. % to 35 wt. %.

6. The silicate-containing glass ceramic according to claim 5, wherein the silicate-containing glass ceramic is crack free and free of gas bubbles.

7. The silicate-containing glass ceramic according to claim 1, wherein the product streams (A) and (B) are mixed at a volume ratio of metal alkoxide to silica of 10:1 to 1:10.

8. The silicate-containing glass ceramic according to claim 1, wherein the silicate-containing glass ceramic is crack free and free of gas bubbles.

9. The silicate-containing glass ceramic of claim 1, wherein the glass ceramic has a thickness of 5 mm.

10. A silicate-containing glass ceramic made by a continuous sol-gel process, comprising the following steps:
(a) continuously feeding a silicon tetraalkoxide, a silicon alkoxide with at least one non-alcoholic functional group and an alcohol into a first reactor (R1), and at least partially hydrolyzing by the addition of a mineral acid to obtain a first product stream (A);
(b) continuously providing a second product stream (B) in a second reactor (R2) by feeding a metal alkoxide component or continuously mixing an alcohol and a metal alkoxide component;
(c) continuously mixing product streams (A) and (B) in a third reactor (R3) for producing a presol to obtain a third product stream (C);
(d) continuously adding water or a diluted acid to the product stream (C) to obtain a sol (gelation);
(e) continuously filling the emerging sol into molds to obtain an aquagel;
(f) drying the aquagels to obtain xerogels; and
(g) sintering the xerogels at a temperature of 950 to 1100° C. to obtain silicate-containing glass ceramic;

wherein the silicon alkoxide with at least one non-alcoholic functional group is selected from the group consisting of methyltriethylsilane, dimethyldiethylsilane, trimethylsilane, methyltriethoxysilane (MTES), triethoxyoctylsilane, octylmethyldichlorosilane, triethoxyvinylsilane and vinyltrimethoxysilane;

and wherein the weight ratio of silicon tetraalkoxide and the silicon alkoxide with at least one non-alcoholic functional group is in the range of 30:1 to 1:5 and wherein zirconium (IV) alkoxides are employed as the metal alkoxide components in step b) and the obtained glass ceramics comprise the metal oxide component in an amount of 20 to 55 wt. %; and wherein the difference in the value of transmission of the silicate-containing glass ceramic in the range of visible light from the value of transmission of silica glass in the range of visible light is no more than 20%.

11. The silicate-containing glass ceramic according to claim 10, characterized in that the silicate-containing glass ceramic have a refractive index nD of 1.45 to 1.8.

12. The silicate-containing glass ceramic according to claim 11, characterized in that the silicate-containing glass ceramic have a refractive index nD of 1.5 to 1.7.

13. The silicate-containing glass ceramic according to claim 10, characterized in that the silicate-containing glass ceramic is transparent for light with a wavelength ranging from 300 to 900 nm.

14. The silicate-containing glass ceramic according to claim 13, characterized in that the silicate-containing glass ceramic is transparent for light with a wavelength ranging from 350 to 850 nm.

15. The silicate-containing glass ceramic of claim 10, wherein the glass ceramic has a thickness of 5 mm.

16. The silicate-containing glass ceramic according to claim 10, wherein a metal oxide component is present in an amount ranging from 20 wt. % to 35 wt. %.

17. The silicate-containing glass ceramic according to claim 16, wherein the silicate-containing glass ceramic is crack free and free of gas bubbles.

18. The silicate-containing glass ceramic according to claim 10, wherein the product streams (A) and (B) are mixed at a volume ratio of metal alkoxide to silica of 10:1 to 1:10.

19. The silicate-containing glass ceramic according to claim 10, wherein the silicate-containing glass ceramic is crack free and free of gas bubbles.

* * * * *